United States Patent [19]
Dworkin et al.

[11] Patent Number: 5,640,336
[45] Date of Patent: Jun. 17, 1997

[54] COMPUTATIONAL ARRAY AND METHOD FOR CALCULATING MULTIPLE TERMS OF A POLYNOMIAL IN A SINGLE COMPUTING ELEMENT

[75] Inventors: James Douglas Dworkin, Chandler; John Michael Buss, Tempe, both of Ariz.

[73] Assignee: Motorola, Schaumburg, Ill.

[21] Appl. No.: 581,800

[22] Filed: Jan. 2, 1996

[51] Int. Cl.$^6$ .................................. G06F 7/38; G06F 7/52
[52] U.S. Cl. ........................................... 364/754; 364/753
[58] Field of Search ........................... 364/715.01, 718, 364/722, 735, 736, 750.5, 753, 754; 395/21, 24, 26, 27

[56] References Cited

U.S. PATENT DOCUMENTS

| | | | |
|---|---|---|---|
| 5,091,864 | 2/1992 | Baji et al. | 395/27 |
| 5,390,136 | 2/1995 | Wang | 364/754 |
| 5,548,752 | 8/1996 | Lloyd et al. | 395/600 |
| 5,574,827 | 11/1996 | Wang | 395/24 |

*Primary Examiner*—Chuong D. Ngo
*Attorney, Agent, or Firm*—S. Kevin Pickens

[57] ABSTRACT

A computational array (120) includes at least one computing element (130) that calculates multiple terms in a polynomial. The computing element (130) obtains an input value of each variable in each of the multiple terms and a subscript uniquely identifying the variable, The computing element (130) reads a term identifier and an exponent corresponding to the variable at a memory location based on the subscript, The computing element (130) multiplies the input value by a selected weight value and multiplies the input value by itself a number of times based on the exponent and stores the result at a memory location corresponding to the term identifier. The computing element (130) calculates multiple terms by distinguishing each of the terms with the term identifier.

35 Claims, 3 Drawing Sheets

SUBSCRIPT ADDRESS

| | TERM IDENTIFIER | EXPONENT |
|---|---|---|
| 0000 | | |
| 0001 | | |
| 0002 | | |
| ⋮ | ⋮ 420 | ⋮ 430 |
| 0126 | | |
| 0127 | | |

TERM IDENTIFIER

| | RESULT[t] | |
|---|---|---|
| 0 | | ~500 |
| ⋮ | | ~500 |
| | | ~500 |
| n | | ~500 |

*FIG. 5*   250

TERM IDENTIFIER

| | WEIGHT[t] | |
|---|---|---|
| 0 | | ~600 |
| ⋮ | | ~600 |
| | | ~600 |
| n | | ~600 |

*FIG. 6*   240

COMPUTATIONAL ARRAY AND METHOD FOR CALCULATING MULTIPLE TERMS OF A POLYNOMIAL IN A SINGLE COMPUTING ELEMENT

TECHNICAL FIELD

This invention relates generally to computer circuits and, more particularly, to computational arrays.

BACKGROUND OF THE INVENTION

A computational array includes a number of computing elements that can be employed for various computer and electronics applications requiring parallel calculations. Each of the computing elements performs a different calculation in parallel as part of this computation. For some computations, a number of parallel calculations may be required which exceeds the number of parallel calculations typically required by most computations. As a result, not all computations can be performed by a computational array having what is normally a sufficient number of computing elements for the applications to which it is typically applied. To accomplish the additional parallel calculations necessary in such circumstances, additional computing elements can be provided. However, some of the computing elements then go unused at other times when only a more typical number of calculations is required, which results in a waste of valuable resources. Thus, it is desirable to provide a computational array which makes more efficient use of the computing elements therein.

SUMMARY OF INVENTION

In a preferred embodiment of the invention, a computational array is provided which calculates polynomials efficiently. One method of calculating polynomials is to calculate each term of the polynomial in parallel, assigning a different computing element in the computational array to each different term, such that the computing elements employed each calculate exactly one term. In such a calculation, each term in the polynomial has a coefficient, or weight, multiplied by one or more variables, which may each be raised to a power. Each computing element calculates a different term in the polynomial by exponentiating each variable in the term and weighting each term, as appropriate. For some polynomial calculations, a number of terms must be calculated which exceeds the number typically present in a polynomial. In such a case, where each computing element of a computational array calculates only one term of the polynomial, as described above, a number of computing elements are required which exceeds a more typical number of computing elements otherwise sufficient to calculate the polynomial. As a result, a computational array that has only such a typical number of computing elements cannot calculate the polynomial unless more computing elements are included in the computational array. However, some of the computing elements then go unused at times when a more typical number of calculations is required, which results in a waste of valuable resources.

The preferred embodiment of the invention provides the advantage of overcoming this problem by providing a computational array which includes at least one computing element that calculates multiple terms of a polynomial. The computing element obtains an input value of a variable in one of the multiple terms and obtains a subscript uniquely identifying the variable. The computing element reads a term identifier and an exponent from a memory at a memory location based on the subscript. The term identifier uniquely identifies a term that includes the variable identified by the subscript. Because a variable is used to identify the term to be calculated, the computing element only calculates multiple terms that do not share any of the same variables. Thus, the term can be identified based on the variable. The exponent indicates a power to which the variable is to be raised. The computing element multiplies the input value by the input value itself a number of times based on the exponent to produce an exponentiated value. This process is performed for each of one or more variables in each different term calculated by the computing element. For each different term, if the term includes multiple variables, the computing element multiplies the corresponding multiple exponentiated values together, to produce a term value, and multiplies the term value by a weight value corresponding to the term identifier to produce a weighted term value. Thus, where the computing element calculates multiple terms, the computing element produces corresponding multiple weighted term values. The weighted term value for each different term is stored in the memory at a different memory location based on each different term identifier corresponding to each different term.

By using each variable to determine the term identifier, and by using the term identifier to distinguish each different term calculated by the computing element, apply the appropriate weight value to each term, and store the weighted term value calculated for each different term in a memory location based on the term identifier, a single computing element is able to calculate multiple terms. As a result, the computational array of the preferred embodiment provides the advantage of calculating a greater number of terms than a computational array with a same number of computing elements which only calculates one term per computing element. Similarly, the computational array of the preferred embodiment provides the advantage of calculating a same number of terms as a computational array having even more computing elements but which only calculates one term per computing element. This provides the advantages of reducing or eliminating unused computing elements, and thus conserving resources.

In a particularly preferred embodiment of the invention, each computing element obtains the input value from a host computer and obtains a subscript address as the subscript from the host computer. The host computer initially assigns the terms to be calculated by different computing elements such that no computing element calculates terms sharing any of the same variables. Each computing element reads the term identifier and the exponent from a random access memory at the subscript address. The computing element selects a corresponding coefficient, or weight value, to apply to each term calculated by the computing element by initially storing the weight value as a result value in a selected result register corresponding to the term identifier. The computing element multiplies the result value, which is initially the weight value, by the input value a number of times based on the value of the exponent, storing each resulting product back into the selected result register each time as the result value. For each additional variable having the same term identifier stored at the subscript address, and thus belonging to the same term, the computing element again multiplies the result value by the input value a number of times based on the value of the exponent, storing each resulting product back into the selected result register each time as the result value. The result value stored in the result register is thus a partially calculated value of the term until completion of calculation of the term, at which time the result value becomes the finally calculated value of the term.

By maintaining the result values in different result registers for different terms, the computing element correctly calculates the terms regardless of the order in which it receives the variables. That is, the computing element may receive first a variable in a first term, then a variable in a second term, then another variable in the first term, and so forth. Since the result value is maintained in a different result register for each different term, each term will be calculated correctly. Thus, the host computer does not have to sort the input values and subscript addresses for the variables, thereby providing the advantage of faster and more efficient calculation.

DETAILED DESCRIPTION OF A PREFERRED EMBODIMENT

Figure 1:
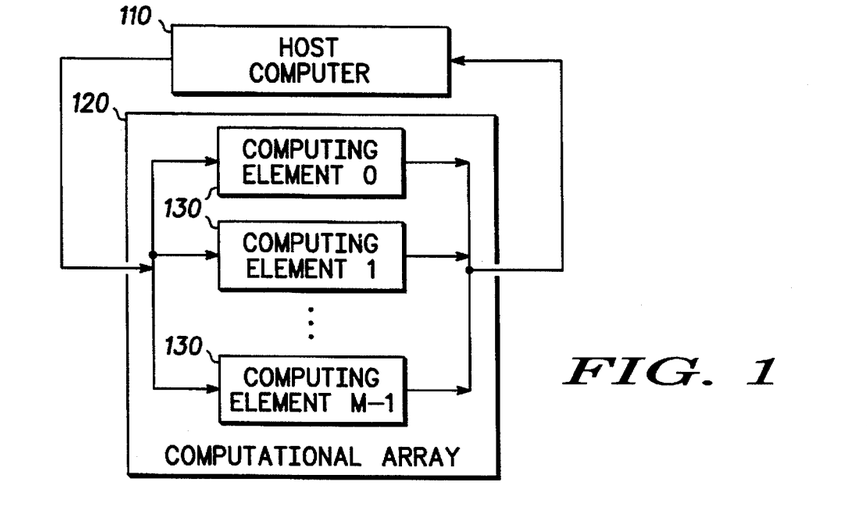
FIG. 1 is a block circuit and data flow diagram of a computer system having a computational array provided in accordance with a preferred embodiment of the invention.

FIG. 1 is a block circuit and data flow diagram of a computer system having a computational array provided in accordance with a preferred embodiment of the invention. In FIG. 1, a host computer 110 is connected to a computational array 120. The host computer 110 is, for example, any conventional computer which runs software that provides inputs to the computational array 120 and obtains outputs from the computational array 120 to calculate the terms of a polynomial. In the preferred embodiment, the computational array 120 is implemented in digital circuitry such as an integrated circuit, which can be provided in a separate computer, in a separate device, as a separate hardware element or as part of the host computer 110. Where the computational array 120 is implemented as an integrated circuit, the invention accordingly provides the advantage of conserving chip area. One of ordinary skill in the art will recognize that the computational array can be implemented in a variety of ways in accordance with the invention described herein.

The host computer 110 utilizes the computational array 120 to perform applications requiring parallel computations, such as the polynomial calculation described herein. The computational array 120 includes a number of computing elements 130 which perform computations in parallel. The computing elements 130 receive various inputs from the host computer 110 through the computational array 120, perform the appropriate computations and provide outputs to the host computer 110 based on the results of those computations. An example of a computational array which calculates a polynomial is described in U.S. patent application No. 08/398,237, entitled "COMPUTATIONAL ARRAY CIRCUIT FOR PROVIDING PARALLEL MULTIPLICATION", filed Mar. 3, 1995, which is hereby incorporated by reference. Additionally, a description of an existing computing element can be found in U.S. Pat. No. 5,390,136, entitled "ARTIFICIAL NEURON AND METHOD OF USING SAME", issued Feb. 14, 1995, which is also hereby incorporated by reference.

Figure 2:
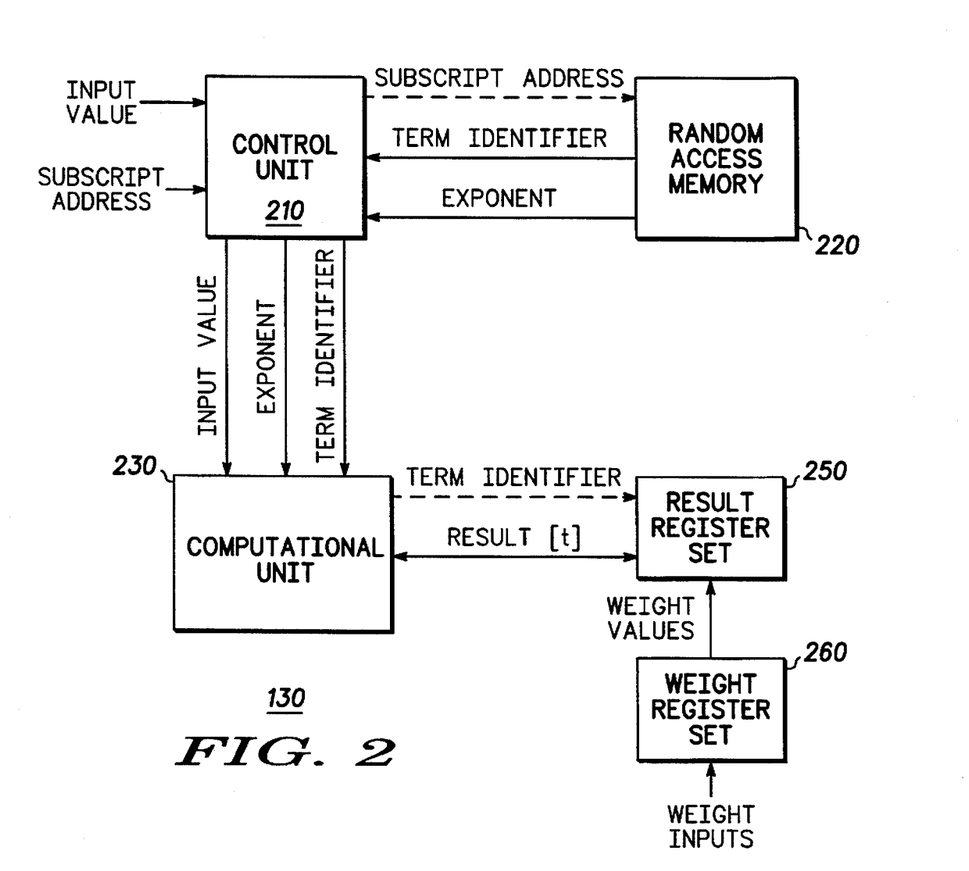
FIG. 2 is a block circuit and data flow diagram of a computing element within the computational array provided in accordance with the preferred embodiment of the invention.

The computing element 130 of the preferred embodiment will now be more specifically described. An example of a polynomial that might be calculated by the computational array of the preferred embodiment is $$y = w_1 x_1^3 x_2^2 x_4 + w_2 x_1 x_3^2 + w_3 x_3 x_5$$

wherein $w_1 x_1^3 x_2^2 x_4$, $w_2 x_1 x_3^2$, and $w_3 x_3 x_5$ are terms, $x_1$, $x_2$, $x_3$, $x_4$, and $x_5$ are variables, and $w_1$, $w_2$, and $w_3$ are weights. The computing element 130 has the capability of calculating multiple terms in the polynomial, and thus can calculate, for example, both the $w_1 x_1^3 x_2^2 x_4$ term and the $w_3 x_3 x_5$ term in the above example, which do not have the same variables. FIG. 2 is a block circuit and data flow diagram of a computing element 130 within the computational array 120. As shown in FIG. 2, the computing element 130 includes a control unit 210 which receives an input value and a subscript address from the host computer 110 of FIG. 1. The input value is the value of a variable in a term in the polynomial to be calculated by the computing element 130. The subscript address uniquely corresponds to the variable having the input value.

The control unit 210 reads a term identifier and an exponent from a random access memory 220 at the subscript address obtained from the host computer 110. Alternatively, as one of ordinary skill in the art will recognize, the random access memory 220 could be any type of memory or storage device. Term identifiers and exponents are previously stored by the host computer based on the terms and variables therein to be calculated by the computing element, as will later be explained in more detail. The term identifier uniquely identifies the term that includes the variable having the currently received input value. The exponent is the exponent of the variable having the input value, and is thus the power to which the input value is to be raised. The control unit 210 provides the input value, the term identifier and the exponent to a computational unit 230.

The computational unit 230 calculates each term to be calculated based on the input value and exponent of all of the variables in all of the terms to be calculated and based on a selected weight value for each term. Specifically, the weight register set 240 contains a number of weight registers each storing a weight value to be applied to a corresponding term among the multiple terms which the computing element 130 calculates. The weight register set 240 obtains the weight values as weight inputs from the host computer 110. One of ordinary skill in the art will understand the process of selecting and modifying weight values in calculating a polynomial. The weight inputs are each stored as a weight value for a different term in a different weight register in the weight register set 240. Prior to each calculation of the polynomial, the weight register set provides the weight values in the weight registers to corresponding result registers in a result register set 250. Thus, initially, before the polynomial is calculated, each result register in the result register set 250 stores the weight value to be applied to each different term. As will be explained in more detail below, during calculation of the polynomial, each result register stores for a corresponding term a changing result value while calculating the term.

One of ordinary skill will in the art will recognize that the computational unit 230 can be implemented in a variety of ways. For example, the computational unit can include a multiplier or can include an adder where the computational array is provided in a logarithmic calculation environment. For example, the computational array could by provided between a logarithmic conversion circuit and an antilogarithmic conversion circuit, similar to the system which is described in U.S. patent application No. 08/398,237, entitled "COMPUTATIONAL ARRAY CIRCUIT FOR PROVIDING PARALLEL MULTIPLICATION", filed Mar. 3, 1995, as mentioned above.

Figure 3:
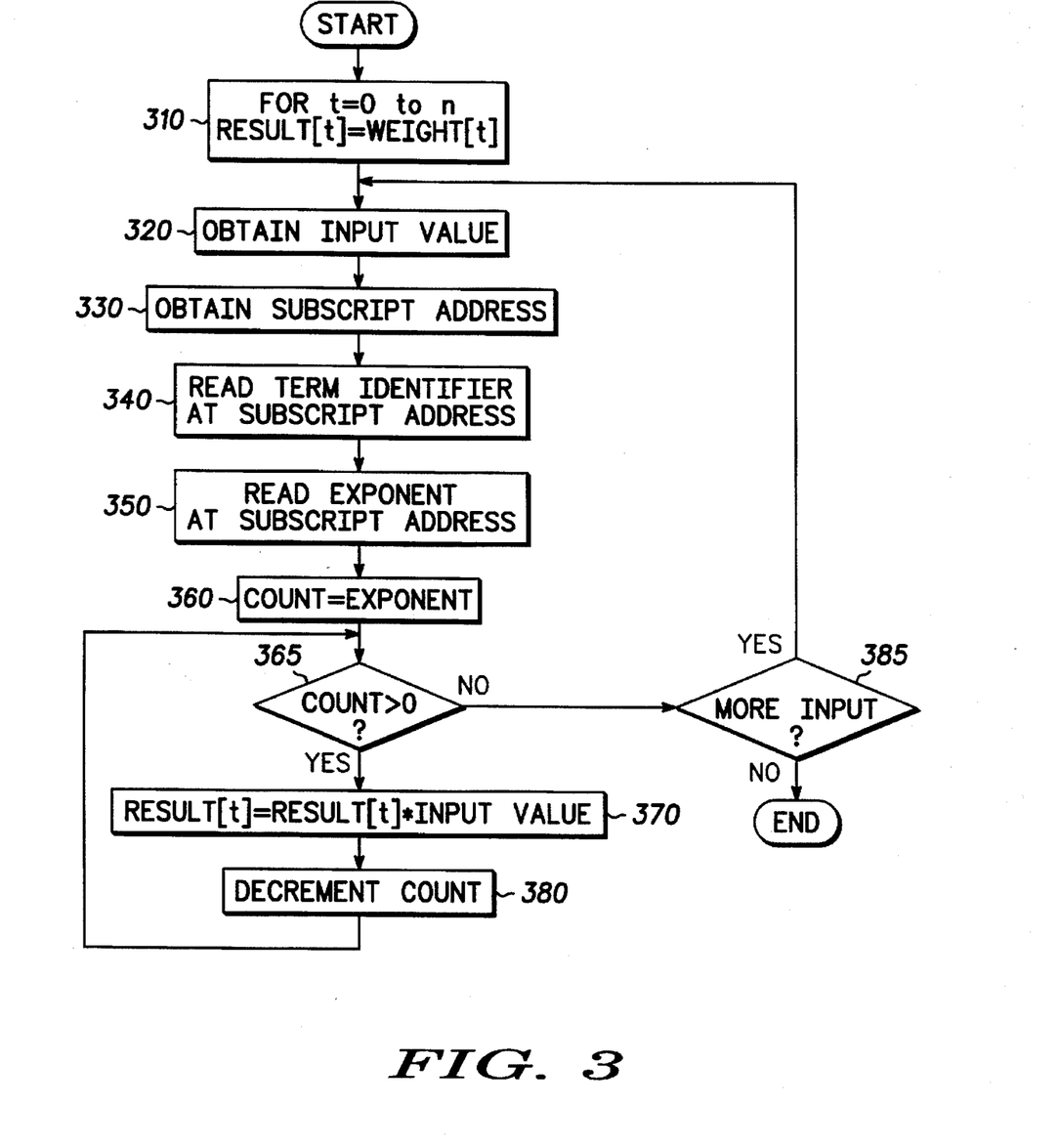
FIG. 3 is a flowchart of the method performed by the computing element in accordance with the preferred embodiment of the invention.

The method performed by the computing element 130 of FIG. 2 will now be explained in detail. Initially, the host computer 110 stores a term identifier and an exponent in the random access memory 220 of each computing element 130 at different memory locations, each corresponding to one of the variables in all of the terms to be calculated by the computing element 130. As noted above, the host computer 110 assigns to each computing element 130 only terms that do not have the same variables. Thus, each variable in the terms calculated by a computing element 130 is represented once in the random access memory 220. Prior to each polynomial calculation, the host computer 110 provides weight inputs to the computing element 130 which the computing element 130 stores as weight values in different weight registers corresponding to each of the different terms among the multiple terms to be calculated by the computing element. This initializes the computing element 130 to calculate multiple terms. FIG. 3 is a flowchart of the method performed by the computing element 130 to calculate a polynomial term in accordance with the preferred embodiment of the invention. In step 310 of FIG. 3, for each term "t" of "n" terms to be calculated by the computing element 130, the computing element 130 initializes the result value, called herein result, stored in a corresponding one of the result registers in a corresponding one of the result registers in the result register set 250 to the weight value for the same term t, called herein weight, in the weight register set 240.

Figure 4:
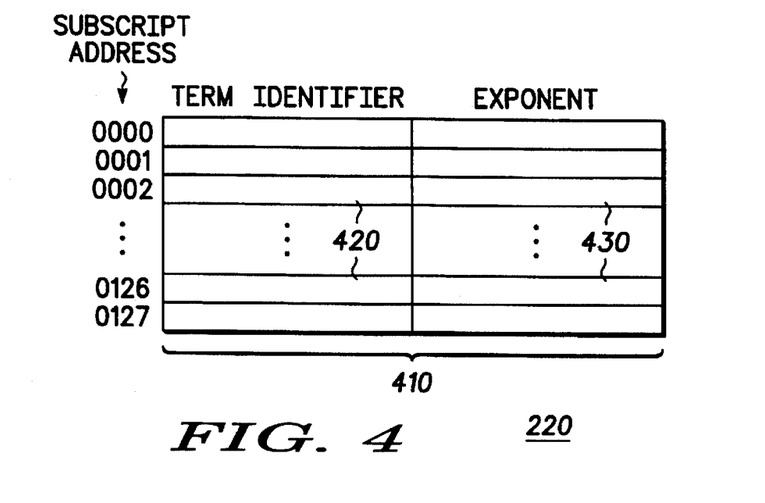
FIG. 4 is a block diagram of a random access memory provided in accordance with the preferred embodiment of the invention and an illustration of the contents thereof.

In step 320, the computing element 130 obtains the input value for a variable in a term to be calculated from the host computer 110. In step 330, the computing element 130 obtains the subscript address for the variable from the host computer 110. In step 340, the computing element 130 reads the term identifier from the random access memory 220 shown in FIG. 2, at the subscript address obtained in step 330. For example, if the variable of the polynomial $$y=w_1x_1^3x_2^2x_4+w_2x_1x_3^2+w_3x_3x_5$$

is $x_5$ from the term $w_3x_3x_5$, the corresponding subscript is 5 and the corresponding subscript address is 0005, then the computing element 130 reads the term identifier from the random access memory 220 at address 0005. In the preferred embodiment, the random access memory 220 is as illustrated in FIG. 4. Each byte of the random access memory 220 contains the term identifier and the exponent. In one possible embodiment, the random access memory 220, or a portion of the random access memory 220 devoted to the functions described herein, is 128 bytes, as shown in FIG. 4. One of ordinary skill in the art would recognize, however, that the memory storing the term identifier and exponent could be of many potential forms and sizes, including differently sized or identified storage locations for the term identifier and the exponent stored at a location based on the subscript, and will implement a memory having the attributes best suited for the application at hand.

The random access memory 220 in FIG. 4 contains a one byte variable field 410 corresponding to each variable. The subscript address of the 128 byte random access memory 220 shown in FIG. 4 thus ranges from address 0000 to 0127. Each variable field contains a term field 420 and an exponent field 430. The term field 420 stores the term identifier and the exponent field 430 stores the exponent. Thus, returning to the example above, the computing element 130 reads the term identifier from address 0005 in the random access memory 220. One of ordinary skill will recognize that the amount of memory devoted to each field can be selected based on the application at hand. For example, four bits might be designated for each variable, where 2 bits represent the term identifier, which would thus have four possible values 0–3, and 2 bits represent the exponent, which would thus have four possible values 0–3.

Returning to FIG. 3, in step 350, the computing element 130 reads the exponent from the random access memory 220 shown in FIG. 2, at the subscript address obtained in step 330. For example, if the current variable is $x_5$ and the subscript is "5", then the computing element 130 reads the exponent from the random access memory 220 at address 0005. Because $x_5$ has an exponent of "1", the computing element 130 would read the number "1" from the exponent field 430 at address 0005. Alternatively, if the variable is, for example, $x_1^3$, then the exponent is "3", and thus the computing element 130 would read the number "3" from the exponent field 430 at address 0001.

In step 360–380 of FIG. 3, the computing element 130 computes the value of the variable based on the input value and the exponent. In step 360, the computing element 130 sets a count value to the value of the exponent. If the variable has an exponent of "3", the count would be set to a value of 3. In step 365, the computing element 130 determines whether the count remains above zero. In the case of a constant, that is, a coefficient or weight value that is not multiplied by a variable, then the exponent is equal to 0. In such a case, the value of the count is 0 so that control branches to step 385 the first time step 365 is executed, and steps 370 and 380 are never performed. Thus, the result value result remains equal to the weight value weight stored in the weight register 600 for the same term. Continuing the previous example, however, where the value of the count is 3, control proceeds to step 370. In step 370, the computing element 130 reads result from a memory location based on the term identifier, multiplies result by the input value and stores the resulting product as the new result value result back into the same memory location. For example, the computing element 130 reads result from a selected result register from the result register set 250 corresponding to the term identifier. Initially, the value in the selected result register is the same as the value in the weight register in the weight register set 240 corresponding to the same term identifier.

Figure 5:
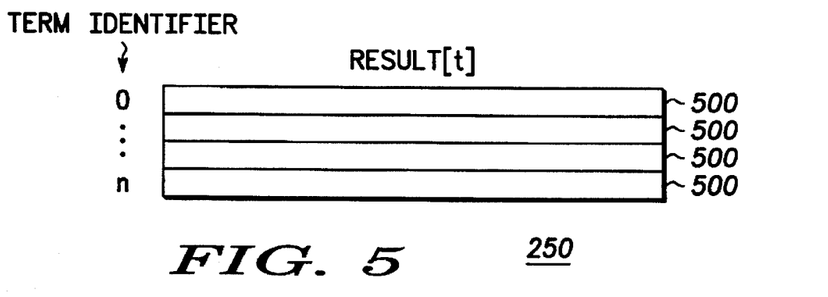
FIG. 5 is a block diagram of a result register set provided in accordance with the preferred embodiment of the invention.
Figure 6:
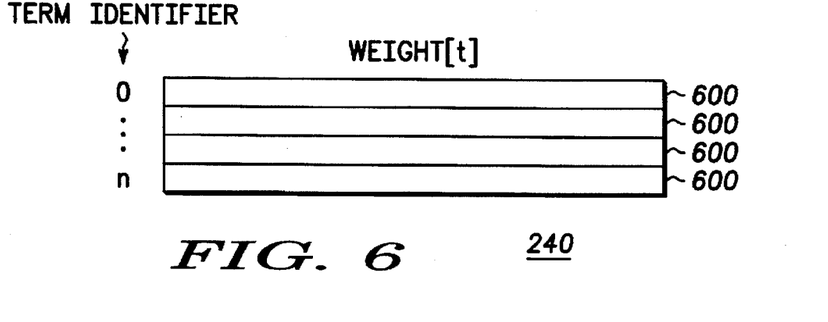
FIG. 6 is a block diagram of a weight register set provided in accordance with the preferred embodiment of the invention.

The result register set 250 of the preferred embodiment is shown in FIG. 5. The result register set 250 contains a result register 500 for each term. Thus, for n possible terms, the result register set 250 contains result registers #0, #1, #2 . . . #n. The weight register set 240 of the preferred embodiment is shown in FIG. 6. Similarly, the weight register set 240 of the preferred embodiment contains weight registers #0, #1, #2 . . . #n. Continuing the above example where the variable is $x_5$, as explained above, the computing element 130 reads the term identifier from the random access memory 220 at the subscript address. Assuming the term identifier stored in the term field 420 of the variable field 410 at subscript address 0005 is "2", then the selected result register 500 is result register #2. The value of result initially stored in result register #2 is the value of weight stored in weight register #2. Assuming a weight input for term #2 equal to 0.5, then 0.5 is stored in result register #2. Thus, as described above, the value of result r stored in result register #2 is also equal to 0.5. Assuming an input value for the variable $x_1$ is equal to 10.0, then the first time step 370 is executed, the input value 10.0 is multiplied by the weight 0.5 and the result value 5.0 is stored in result register #2 as a weighted input value.

In step 380, the count is decremented and control loops back to step 365. This ensures that steps 370 and 380 will be executed a number of times equal to the value of the exponent, which in turn assures that the value of the current variable is exponentiated to the correct degree. Continuing with the above example, the count is decremented to 2 and control proceeds to step 370. In step 370, the current value of result stored in result register #2 is again multiplied by the input value. Thus, 5.0 would be multiplied by 10.0 and the result value 50.0 would be stored back in result register #2. In step 380, the count is decremented to 1 and control again proceeds to 370, where the value 50.0 stored in result register #2 is again multiplied by the input value 10.0 and the result value 500.0 is stored back in result register #2 as a weighted exponentiated value. The count is decremented to 0, and control loops to step 365. This time, in step 365, control branches to step 385. In step 385, the computing element 130 determines whether more input is received from the host computer 110. If so, control loops to step 320 and the next input value and subscript address are obtained.

If, in the above example, the entire term to be calculated were $w_1 x_1^3$, then 500.0 would be the final result stored in result register #2 when, in step 385, the computing element 130 finally determines that no more input is received. If the next input value and subscript address received correspond to a variable in a different term, a term identifier other than "2" will be stored in the term field 420 of the appropriate variable field 410, at the subscript address received, in the random access memory 220. Thus, the new variable will be calculated and stored in a different result register 500 in the result register set 250. A different weight will be applied to each different term, since a different weight was initially stored in the result register 500 for each term in step 310. On the other hand, if the next input value and subscript address received correspond to another variable in the same term as before, the term identifier stored in the term field 420 of the variable field 410, at the subscript address received, in the random access memory 220 will also be "2". As a result, the next input value will be multiplied by the current result in result register #2, which is initially 500.0, the number of times indicated by the exponent stored at the new subscript address and the result value will be stored in result register #2 each time.

Upon completion of calculation of all of the terms the computing element 130 is to calculate, the computing element 130 then outputs the final output values in the result registers 500 to the host computer 110. Alternatively, the host computer 110 reads the output value from result registers 500. The host computer 110 may contain a sum circuit, implemented in either hardware or software, which calculates the sum of every output value from all the computing elements 130 to calculate the polynomial. Alternatively, the computer system of FIG. 1 may contain an additional sum circuit (not shown) provided, for example, between the computational array and the host computer, which calculates a sum of every output value from all the computing elements 130 to calculate the polynomial.

The computational array 120 described above provides the advantages of calculating a greater number of terms than a computational array with a same number of computing elements that only calculates one term per computing element. Similarly, the computational array 120 of the preferred embodiment provides the advantages of calculating a same number of terms as a computational array having even more computing elements which only calculates one term per computing element. This provides the advantage of conserving resources. For example, where the computational array 120 is implemented as an integrated circuit, chip area is conserved. While specific embodiments of the invention have been shown and described, further modifications and improvements will occur to those skilled in the art. It is understood that this invention is not limited to the particular forms shown and it is intended for the appended claims to cover all modifications of the invention which fall within the true spirit and scope of the invention.

What is claimed is:

1. A computational array for calculating multiple terms of a polynomial in a single computing element in the computational array, the computational array comprising:

a plurality of computing elements including the single computing element calculating the multiple terms, the single computing element comprising a control unit obtaining an input value of a variable in a term of the multiple terms and obtaining a subscript uniquely identifying the variable, a memory, connected to the control unit, storing a term identifier uniquely identifying the term having the variable and storing an exponent of the variable uniquely identified by the subscript, the control unit reading the term identifier and the exponent from the memory at a memory location based on the subscript, a computational unit, connected to the control unit, obtaining the input value, the term identifier and the exponent from the control unit, a result register set, connected to the computational unit, having a plurality of result registers, each of the plurality of result registers initially storing a weight value corresponding to a different one of the multiple terms, the computational unit multiplying the weight value of a selected weight value, the selected weight value being stored in a selected result register identified by the term identifier, by the input value a number of times based on the exponent to produce a weighted exponentiated value and storing the weighted exponentiated value in the selected result register.

2. The computational array of claim 1 wherein the control unit obtains multiple input values for each of multiple variables in the term of the multiple terms identified by the term identifier, and obtains corresponding multiple subscripts for each of the multiple variables, and the computational unit multiplies each of the multiple input values by itself a number of times based on the exponent to produce an exponentiated value, thus providing multiple exponentiated values corresponding to the multiple input values, the computational unit multiplies the multiple exponentiated values together, and the computational unit multiplies the multiple exponentiated values by the weight value to produce a weighted term value and stores the weighted term value in the selected result register.

3. The computational array of claim 2 wherein the control unit obtains the multiple input values for each of the multiple variables in each of the multiple terms, the memory stores a different term identifier and a different exponent at each of multiple memory locations based on each of the multiple subscripts, and the computational unit multiplies the multiple exponentiated values together for each of the multiple variables in each of the multiple terms identified by a different term identifier, the computational unit multiplies the multiple exponentiated values for the multiple variables in each of the multiple terms by the weight value stored in the selected result register identified by the different term identifier, and the computational unit stores the weighted term value for each of the multiple terms in the selected result register identified by the different term identifier for each of the multiple terms.

4. The computational array of claim 1, further comprising a weight register set, connected to the result register set, having a plurality of weight registers each storing and providing the weight value for each of the multiple terms to a corresponding one of the plurality of result registers.

5. The computational array of claim 1 wherein the control unit obtains a subscript address as the subscript, the subscript address being the memory location of the memory where the term identifier and the exponent are stored.

6. The computational array of claim 1 wherein the memory is a random access memory.

7. The computational array of claim 1 wherein the computational unit comprises a multiplier.

8. The computational array of claim 1 wherein the computational unit comprises an adder.

9. A computing element in a computational array for calculating multiple terms in a polynomial having a plurality of terms, each term of the plurality of terms having one or more variables, the computing element comprising:
   a control unit obtaining an input value of a variable of the one or more variables in a term of the multiple terms and obtaining a subscript uniquely identifying the variable;
   a first memory, coupled to the control unit, storing a term identifier uniquely identifying the term having the variable and storing an exponent of the variable uniquely identified by the subscript, the control unit reading the term identifier and the exponent from the first memory at a first memory location based on the subscript;
   a computational unit, coupled to the control unit, obtaining the input value, the term identifier and the exponent from the control unit; and
   a second memory, coupled to the computational unit, the computational unit multiplying the input value by a selected weight value, multiplying the input value by the input value a number of times based on the exponent and storing a result value in the second memory at a second memory location.

10. The computing element of claim 9 wherein the control unit obtains a subscript address as the subscript, the subscript address being the first memory location of the first memory where the term identifier and the exponent are stored.

11. The computing element of claim 9 wherein the first memory is a random access memory.

12. The computing element of claim 9 wherein the second memory is a result register set comprising a plurality of result registers, each of the plurality of result registers initially storing a weight value corresponding to a different one of the multiple terms, the computational unit multiplying the weight value, stored in a selected result register identified by the term identifier, by the input value a number of times based on the exponent to produce a weighted exponentiated value and storing the weighted exponentiated value in the selected result register.

13. The computing element of claim 9 wherein the second memory is a random access memory.

14. The computing element of claim 9 wherein the computational unit reads the selected weight value from the second memory at the second memory location based on the term identifier.

15. The computing element of claim 9 wherein the computational unit reads the selected weight value from the second memory at a third memory location based on the term identifier.

16. A computer system comprising:
   a host computer; and
   a computational array for calculating a polynomial having a plurality of terms, the computational array comprising
   a plurality of computing elements, the plurality of computing elements including a single computing element calculating multiple terms of the plurality of terms, the single computing element comprising
   a control unit obtaining an input value of a variable of one or more variables in a term of the multiple terms and obtaining a subscript uniquely identifying the variable,
   a first memory, coupled to the control unit, storing a term identifier uniquely identifying the term having the variable and storing an exponent of the variable, the control unit reading the term identifier and the exponent from the first memory at a first memory location based on the subscript,
   a computational unit, coupled to the control unit, obtaining the input value, the term identifier and the exponent from the control unit,
   a second memory, coupled to the computational unit, the computational unit multiplying the input value by a selected weight value, multiplying the input value by the input value a number of times based on the exponent, and storing a result in the second memory at a second memory location.

17. The computer system of claim 16 wherein the control unit obtains a subscript address as the subscript, the subscript address being the first memory location of the first memory where the term identifier and the exponent are stored.

18. The computer system of claim 16 wherein the first memory is a random access memory.

19. The computer system of claim 18 wherein the second memory is a result register set comprising a plurality of result registers, each of the plurality of result registers initially storing a weight value corresponding to a different one of the multiple terms, the computational unit multiplying the weight value, stored in a selected result register identified by the term identifier, by the input value a number of times based on the exponent to produce a weighted exponentiated value and storing the weighted exponentiated value in the selected result register.

20. The computer system of claim 16 wherein the second memory is a random access memory.

21. The computer system of claim 16 wherein the host computer provides, before calculating the polynomial, one or more weight inputs to the second memory.

22. The computer system of claim 16 wherein the computational unit reads the selected weight value from the second memory at the second memory location based on the term identifier.

23. The computer system of claim 16 wherein the computational unit reads the selected weight value from the second memory at a third memory location based on the term identifier.

24. A computing element in a computational array calculating multiple terms in a polynomial, the computing element comprising:

a control unit obtaining an input value of a variable in a term of the multiple terms and obtaining a subscript uniquely identifying the variable;

a memory, coupled to the control unit, storing a term identifier uniquely identifying the term of the multiple terms having the variable and storing an exponent of the variable, the control unit reading the term identifier and the exponent from the memory at a first memory location based on the subscript; and a computational unit, coupled to the control unit, obtaining the input value, the term identifier and the exponent from the control unit, multiplying the input value by the input value a number of times based on the exponent to produce an exponentiated value and storing the exponentiated value in the memory at a second memory location based on the term identifier.

25. The computing element of claim 24 wherein the control unit obtains multiple input values for each of multiple variables in the term of the multiple terms identified by the term identifier, obtains corresponding multiple subscripts for each of the multiple variables and produces multiple exponentiated values corresponding to the multiple input values, and the computational unit multiplies the multiple exponentiated values together to produce a term value and stores the term value in the memory at the second memory location based on the term identifier.

26. The computing element of claim 25 wherein the computational unit multiplies the term value by a weight value to produce a weighted term value and stores the weighted term value in the memory at the second memory location based on the term identifier.

27. The computing element of claim 26 wherein the control unit obtains the multiple input values for each of multiple variables in each of the multiple terms, the memory stores a different term identifier and a different exponent at each of multiple memory locations based on each of the multiple subscripts, and the computational unit multiples the multiple input values together for each of the multiple variables in each of the multiple terms identified by a different term identifier and stores the weighted term value for each of the multiple terms in the memory at a different memory location based on the term identifier for each of the multiple terms.

28. The computing element of claim 25 wherein the control unit obtains the multiple input values for each of multiple variables in each of the multiple terms, the memory stores a different term identifier and a different exponent at each of multiple memory locations based on each of the multiple subscripts, and the computational unit multiplies the multiple input values together for each of the multiple variables in each of the multiple terms identified by a different term identifier to produce a term value for each of the multiple terms, and stores the term value for each of the multiple terms in the memory at the second memory location based on the term identifier corresponding to each of the multiple terms.

29. The computing element of claim 24 wherein the computational unit multiplies the exponentiated value by a weight value to produce a weighted exponentiated value and stores the weighted exponentiated value in the memory at the second memory location based on the term identifier.

30. A method of calculating multiple terms of a polynomial in a single computing element of a computational array having a plurality of computing elements including the single computing element, the polynomial having a plurality of terms including the multiple terms, each of the multiple terms having one or more variables, the method comprising the steps of:

storing a term identifier and an exponent in a memory at each of a number of different memory locations in the single computing element, the different memory locations corresponding to all of the one or more variables in all of the multiple terms;

obtaining an input value of a variable in one of the multiple terms;

obtaining a subscript uniquely identifying the variable;

reading the term identifier and the exponent from the memory at a first memory location based on the subscript;

multiplying the input value by the input value a number of times based on a value of the exponent to produce an exponentiated value; and storing the exponentiated value in the memory at a second memory location based on the term identifier.

31. The method of claim 30 wherein the step of obtaining the input value further comprises obtaining multiple input values for each of multiple variables in a term of the multiple terms identified by the term identifier, the step of obtaining the subscript further comprises obtaining corresponding multiple subscripts, and the step of multiplying the input value further comprises multiplying the multiple input values to produce multiple exponentiated values corresponding to the multiple input values, and the method further comprising the steps of multiplying the multiple exponentiated values together to produce a term value, and storing the term value in the memory at the second memory location based on the term identifier.

32. The method of claim 31, further comprising the steps of multiplying the term value by a weight value to produce a weighted term value, and storing the weighted term value in the memory at the second memory location based on the term identifier.

33. The method of claim 32 wherein the step of storing the term identifier and the exponent comprises storing a different term identifier and a different exponent at each of multiple memory locations based on each of the multiple subscripts, the step of obtaining the multiple input values for each of the multiple variables comprises obtaining the multiple input values for each of the multiple variables in each of the multiple terms, the step of multiplying the multiple exponentiated values together comprises multiplying the multiple exponentiated values together for each of the multiple variables in each of the multiple terms identified by a different term identifier, and the step of storing the weighted term value comprises storing the weighted term value for each of the multiple terms in the memory at a different memory location based on the term identifier for each of the multiple terms.

34. The method of claim 31 wherein the step of storing the term identifier and the exponent comprises storing a different term identifier and a different exponent at each of multiple memory locations based on each of the multiple subscripts, the step of obtaining the multiple input values comprises obtaining the multiple input values for each of multiple variables in each of the multiple terms, and the step of multiplying the multiple exponentiated values together comprises multiplying the multiple exponentiated values together for each of the multiple variables in each of the multiple terms identified by a different term identifier to produce a term value for each of the multiple terms, and further comprising the step of storing the term value for each of the multiple terms in the memory at the second memory location based on the term identifier corresponding to each of the multiple terms.

35. The method of claim 30 further comprising the steps of multiplying the exponentiated value by a weight value to produce a weighted exponentiated value, and storing the weighted exponentiated value in the memory at the second memory location based on the term identifier.

* * * * *